(12) United States Patent
Joutaki et al.

(10) Patent No.: US 6,729,424 B2
(45) Date of Patent: May 4, 2004

(54) RADIATOR CORE SUPPORT STRUCTURE OF MOTOR VEHICLE

(75) Inventors: Noboru Joutaki, Kanagawa (JP); Hiroshi Kondo, Kanagawa (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/995,805

(22) Filed: Nov. 29, 2001

(65) Prior Publication Data

US 2002/0070062 A1 Jun. 13, 2002

(30) Foreign Application Priority Data

Nov. 29, 2000 (JP) .......................... 2000-363344

(51) Int. Cl.[7] .......................... B60K 11/04; B62D 25/08
(52) U.S. Cl. .................. 180/68.4; 180/311; 296/203.02
(58) Field of Search ................. 180/68.4, 68.6, 180/299, 311; 296/194, 196, 197, 193, 203.01, 230.02

(56) References Cited

U.S. PATENT DOCUMENTS

| | | | | |
|---|---|---|---|---|
| 4,141,426 A | * | 2/1979 | Hamada et al. ............ | 180/68.4 |
| 4,428,447 A | * | 1/1984 | Malen ....................... | 180/68.4 |
| 4,940,281 A | * | 7/1990 | Komatsu ................... | 296/194 |
| 5,348,114 A | * | 9/1994 | Yamauchi .................. | 180/291 |
| 5,573,299 A | * | 11/1996 | Masuda ..................... | 296/194 |
| 5,658,041 A | | 8/1997 | Girardot et al. | |
| 6,168,226 B1 | * | 1/2001 | Wycech .................... | 296/146.6 |
| 6,170,906 B1 | * | 1/2001 | Kasuga ................... | 296/203.02 |
| 6,189,958 B1 | | 2/2001 | Guyomard et al. | |
| 6,216,810 B1 | | 4/2001 | Nakai et al. ............... | 180/68.4 |
| 6,386,624 B1 | * | 5/2002 | Schultz et al. ............. | 296/194 |
| 6,502,653 B1 | * | 1/2003 | Balzer et al. .............. | 180/68.4 |
| 6,547,317 B1 | * | 4/2003 | Cheron et al. .............. | 296/194 |
| 6,619,419 B1 | * | 9/2003 | Cheron et al. ............. | 180/311 |
| 2002/0060476 A1 | | 5/2002 | Cantineau et al. | |

FOREIGN PATENT DOCUMENTS

| | | |
|---|---|---|
| JP | 5-105115 | 4/1993 |
| JP | 9-226625 | 9/1997 |
| JP | 10-264855 | 10/1998 |
| WO | WO 00/18632 | 4/2000 |
| WO | WO 00/18634 | 4/2000 |

* cited by examiner

*Primary Examiner*—Brian L. Johnson
*Assistant Examiner*—Bridget Avery
(74) *Attorney, Agent, or Firm*—Foley & Lardner LLP (57) ABSTRACT

A radiator core support structure includes an upper elongate member made of metal, and a lower elongate member made of metal. Between the upper and lower elongate members, there extend mutually spaced pillar portions of integrally molded plastic. The connection between the pillar portions and each of the upper and lower elongate members is integrally carried out by injection molding.

9 Claims, 10 Drawing Sheets

RADIATOR CORE SUPPORT STRUCTURE OF MOTOR VEHICLE

BACKGROUND OF THE INVENTION

1. Field of the Invention

The present invention relates to a radiator core support structure of a vehicle body, which is mounted to a front portion of the vehicle body to support a radiator and the like.

2. Description of the Related Art

Hitherto, various types of radiator core support structures for motor vehicles have been proposed and put into practical use. Usually, the radiator core support structures have a basic structure which comprises radiator core support upper and lower members (which will be referred to as "upper and lower elongate members" for ease of description) which extend laterally with respect to a vehicle body and a hood lock stay member which extends vertically between intermediate portions of the upper and lower elongate members. These three members of the basic structure are made of metal and welded to one another to constitute a constructional base of the radiator core support structure. However, welding the hood lock stay member to both the upper and lower elongate members tends to induce deformation or distortion of the product (viz., radiator core support structure) due to the high heat used for the welding. As is easily known, if the radiator core support structure produced fails to have a satisfied dimensional stability, mounting the support structure to a vehicle body needs a difficult or at least time-consumed mounting work.

In order to solve the above-mentioned drawback, several measures have been proposed, some of which are shown in Laid open Japanese Patent Applications (Tokkai Hei) 5-105115 and 10-264855. That is, in these measures, substantially all elements of the radiator core support structure are made of integrally molded plastic. In the latter publication, a metallic reinforcing member is added which lies on the uppermost portion of the radiator core support structure.

However, due to the nature of the plastics, the radiator core support structure proposed by such publications fails to have a satisfied rigidity or mechanical strength. As is known, the radiator core support structure has an upper portion to which a hood lock device for an engine hood is mounted. Thus, when the radiator core support structure fails to have a satisfied rigidity, it can not bear a marked shock which is produced when the engine hood is strongly pivoted down to assume a closed position. This drawback becomes more severe when an associated motor vehicle is subjected to a vehicle collision, particularly, head-on collision. That is, upon such collision, a locked engagement between the hood lock device and the hood is easily broken due to the insufficient mechanical strength of the radiator core support structure.

SUMMARY OF THE INVENTION

It is therefore an object of the present invention to provide a radiator core support structure which is free of the above-mentioned drawbacks.

According to a first aspect of the present invention, there is provided a radiator core support structure which comprises an upper elongate member made of metal; a lower elongate member made of metal; and mutually spaced pillar portions of integrally molded plastic, each pillar portion having an upper end connected to the upper elongate member and a lower end connected to the lower elongate member, the connection between each of the pillar portions and each of the upper and lower elongate members being integrally carried out by injection molding.

According to a second aspect of the present invention, there is provided a radiator core support structure which comprises an upper elongate member made of metal; a hood lock mounting member made of metal, the hood lock mounting member being welded to an intermediate portion of the upper elongate member; a lower elongate member made of metal; two side members made of metal, the side members being welded to laterally opposed ends of the lower elongate member; a hood lock stay portion made of an integrally molded plastic, the hood lock stay portion having an upper end connected to the hood lock mounting member and a lower end connected to an intermediate portion of the lower elongate member; two pillar portions made of the integrally molded plastic, each pillar portion extending between laterally outside portions of the upper and lower elongate members; an upper reinforcing structure made of the integrally molded plastic, the upper reinforcing structure extending in a channel defined in the upper elongate member and integrally connected with the upper end of the hood lock stay portion as well as the upper ends of the two pillar portions; and a lower reinforcing structure made of the integrally molded plastic, the lower reinforcing structure extending in a channel defined in the lower elongate member and integrally connected with the lower end of the hood lock stay portion as well as the lower ends of the two pillar portions.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a radiator core support structure of the present invention will be described in detail with reference to the accompanying drawings.

For ease of understanding, various directional terms, such as, upper, lower, right, left, upward, downward, etc., are used in the description. However, such terms are to be understood with respect to only a drawing or drawings on which the corresponding part or parts are illustrated.

Figure 1:
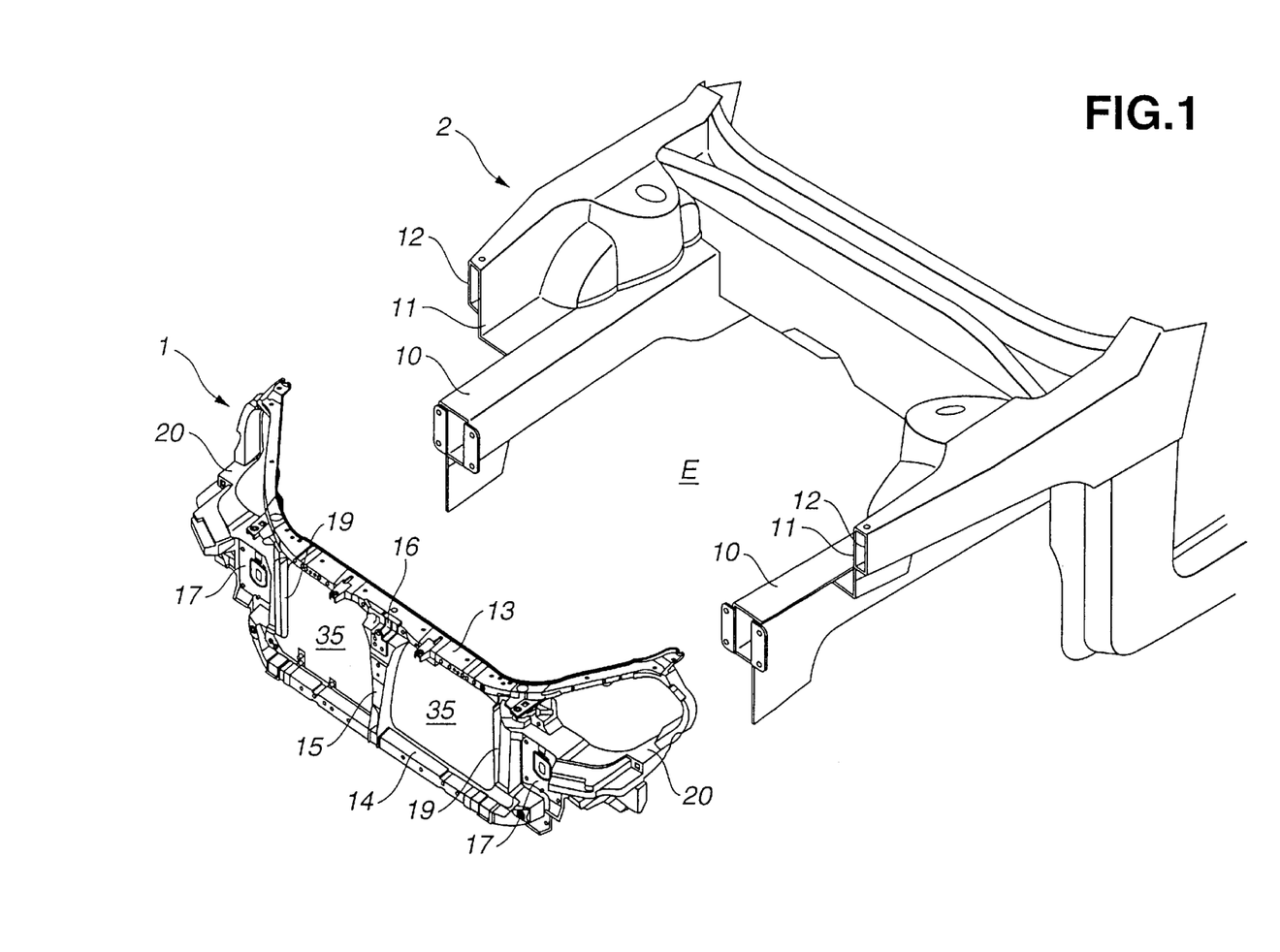
FIG. 1 is a perspective view of a radiator core support structure of the present invention and a front structure of a motor vehicle to which the radiator core support structure is to be mounted.
Figure 2:
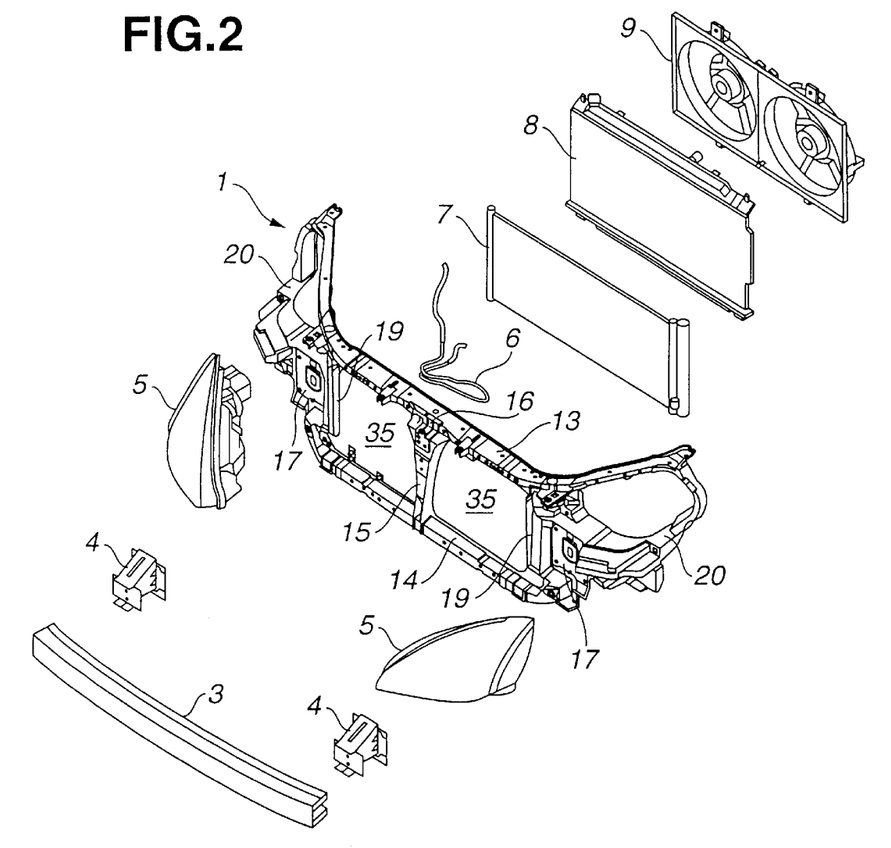
FIG. 2 is a perspective view of the radiator core support structure of the present invention and other parts which are mounted to the radiator core support structure form a module.

In FIGS. 1 and 2, denoted by numeral 1 is a radiator core support structure according to the present invention, and denoted by numeral 2 is a front structure of a motor vehicle body.

As is seen from FIG. 2, before the radiator core support structure 1 is mounted to the front structure 2, the structure 1 is assembled with a bumper armature 3, bumper stays 4, lamps 5, a power-steering oil cooler tube 6, a condenser 7, a radiator 8 and a fun shroud 9 to constitute a part carrier module. That is, the part carrier module carrying such various parts is mounted to the front structure 2 at a time, which facilitates the parts mounting work needed by an assembler.

As is seen from FIG. 1, the front structure 2 of the vehicle body is constructed to constitute an engine room "E" and comprises two forwardly extending front side members 10. Each side member 10 has an enclosed rectangular cross section. On and along an outside portion of each side member 10, there extends a hood ridge panel 11, and on and along an outside portion of the hood ridge panel 11, there extends a hood ridge reinforcing member 12. As shown, the hood ridge panel 11 and the hood ridge reinforcing member 12 are united via welding to constitute a boxy structure having an enclosed cross section.

Figure 3:
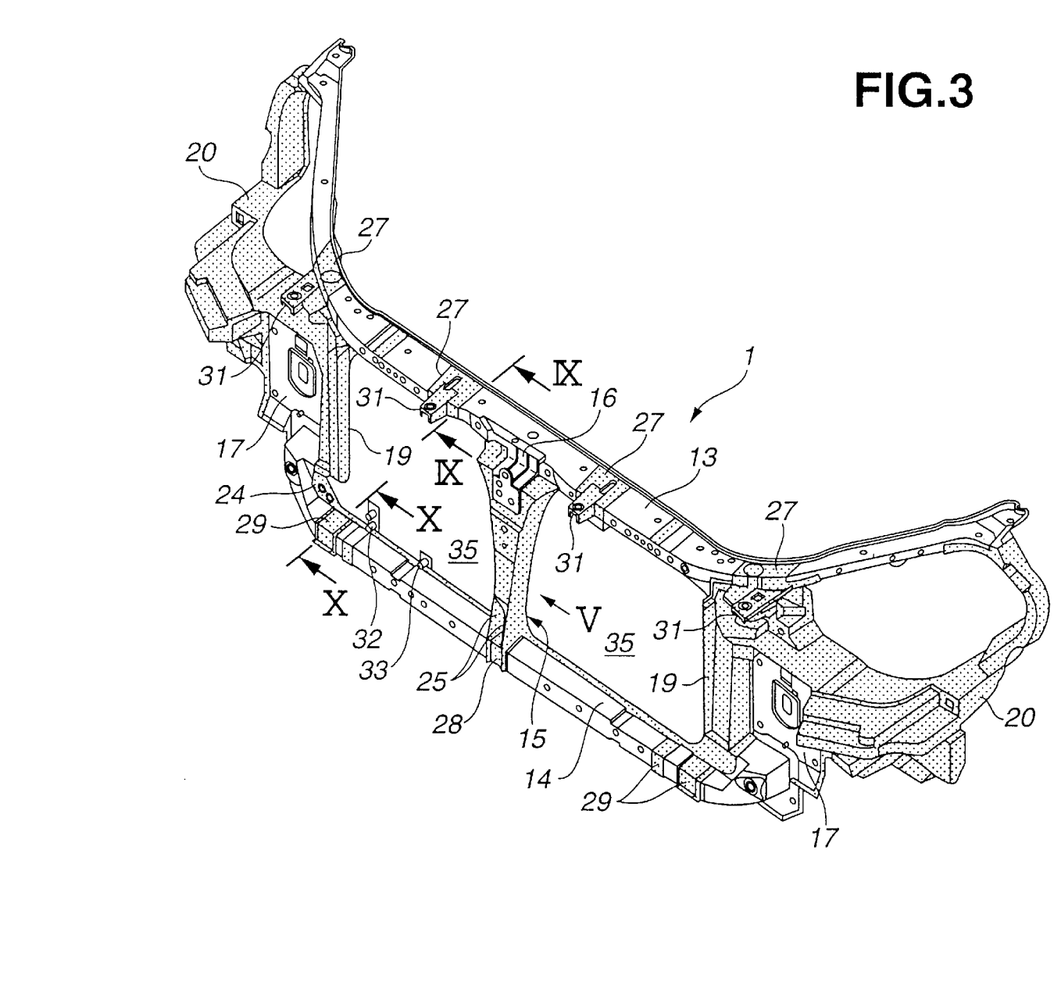
FIG. 3 is a perspective of the radiator core support structure of the present invention, showing portions illustrated by half-tone dot meshing, which are made of integrally molded plastic.

As is best seen from FIG. 3, the radiator core support structure 1 comprises parts constructed of metal and parts constructed of integrally molded plastic. The metal parts are illustrated by shaped blank and plastic parts are illustrated by half-tone dot meshing.

The radiator core support structure 1 has a basic structure which generally comprises radiator core support upper and lower members 13 and 14 (which will be referred to as "upper and lower elongate members" for ease of description) which extend laterally with respect to the vehicle body and a hood lock stay portion 15 which extends vertically between intermediate portions of the upper and lower elongate members 13 and 14.

Figure 4:
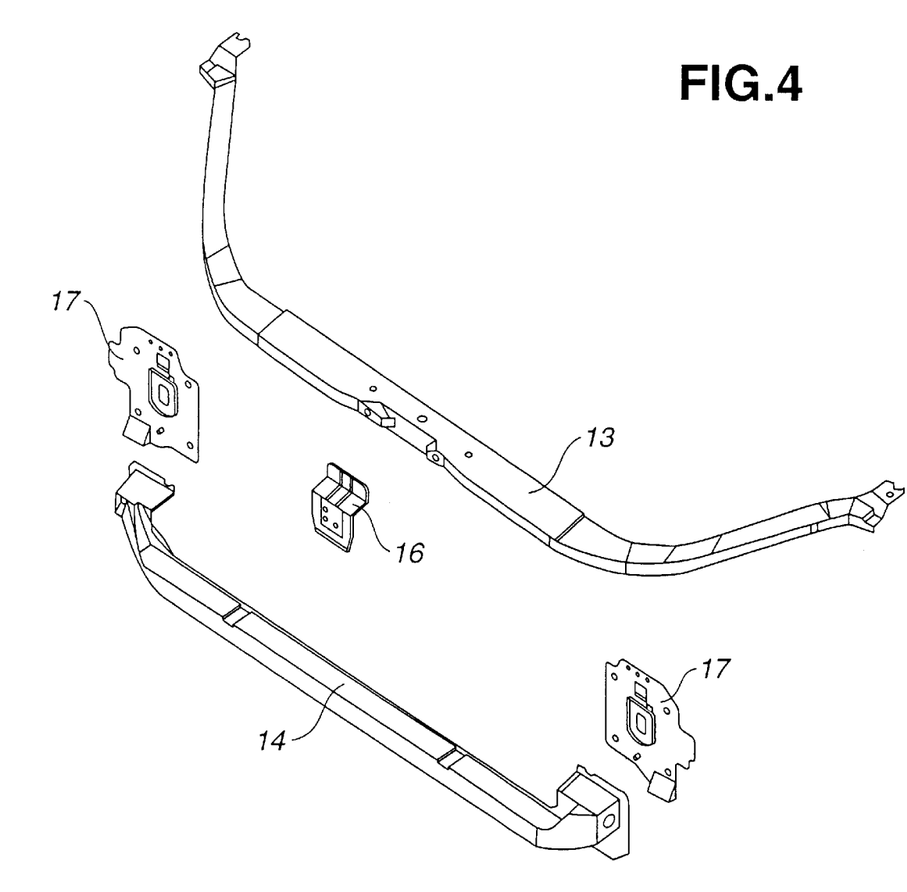
FIG. 4 is a perspective view of some parts of the radiator core support structure of the present invention, which are made of metal.

FIG. 4 shows only the parts made of metal, which are the upper and lower elongate members 13 and 14, a hood lock mounting member 16 which is welded to an intermediate portion of the upper elongate member 13, and two side members 17 which are welded to lateral ends of the lower elongate member 14. If desired, the hood lock mounting member 16 may be integrally formed on the upper elongate member 13, and the side members 17 may be integrally formed on the lower elongate member 14.

Figure 9:
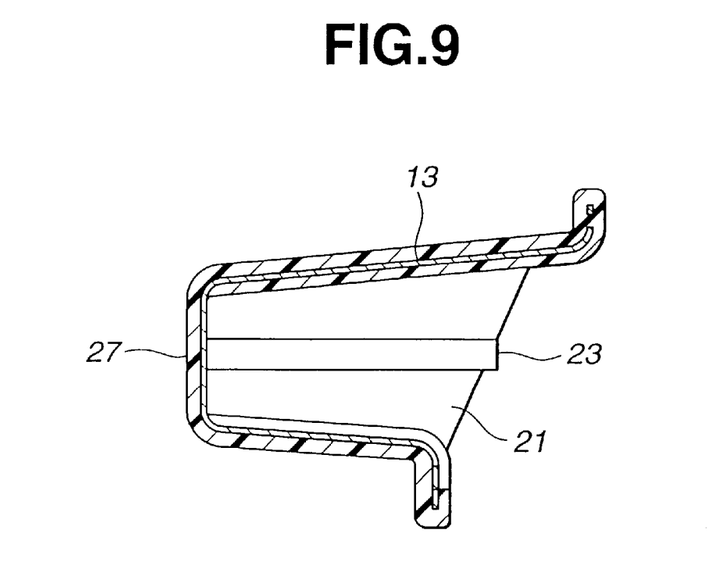
FIG. 9 is an enlarged sectional view taken along the line "IX—IX" of FIG. 3, showing an upper elongate member.
Figure 10:
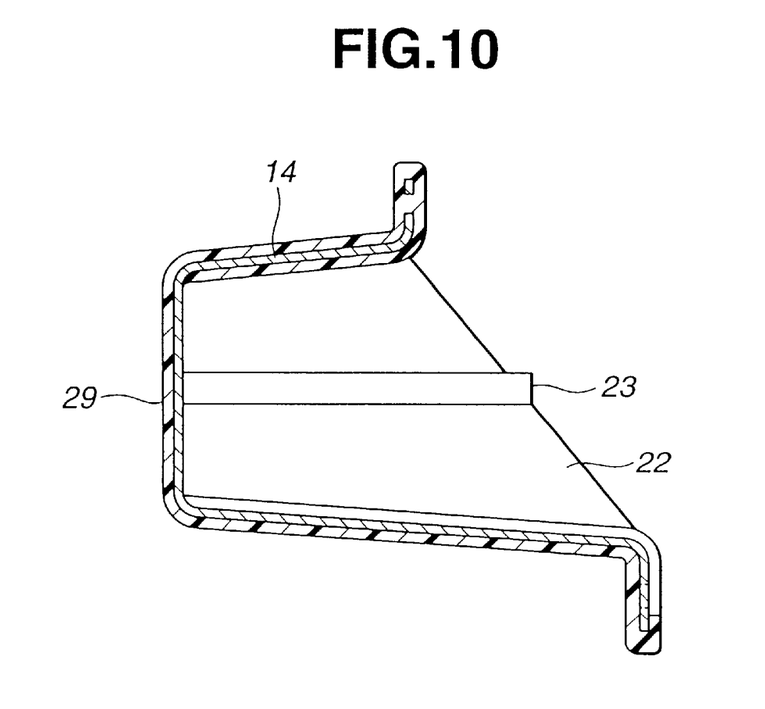
FIG. 10 is an enlarged sectional view taken along the line "X—X" of FIG. 3, showing the lower elongate member.

As will be seen from FIGS. 9 and 10, the upper and lower elongate members 13 and 14 are of a channel member having a generally hat-shaped cross section. As is seen from FIG. 1, upon mounting on the front structure 2 of the vehicle body, the upper and lower elongate members 13 and 14 are orientated so that the channels thereof face rearward, that is, toward the front structure 2 of the vehicle body.

In order to produce or complete the radiator core support structure 1 of the present invention, the following plastic molding process is carried out.

Figure 11:
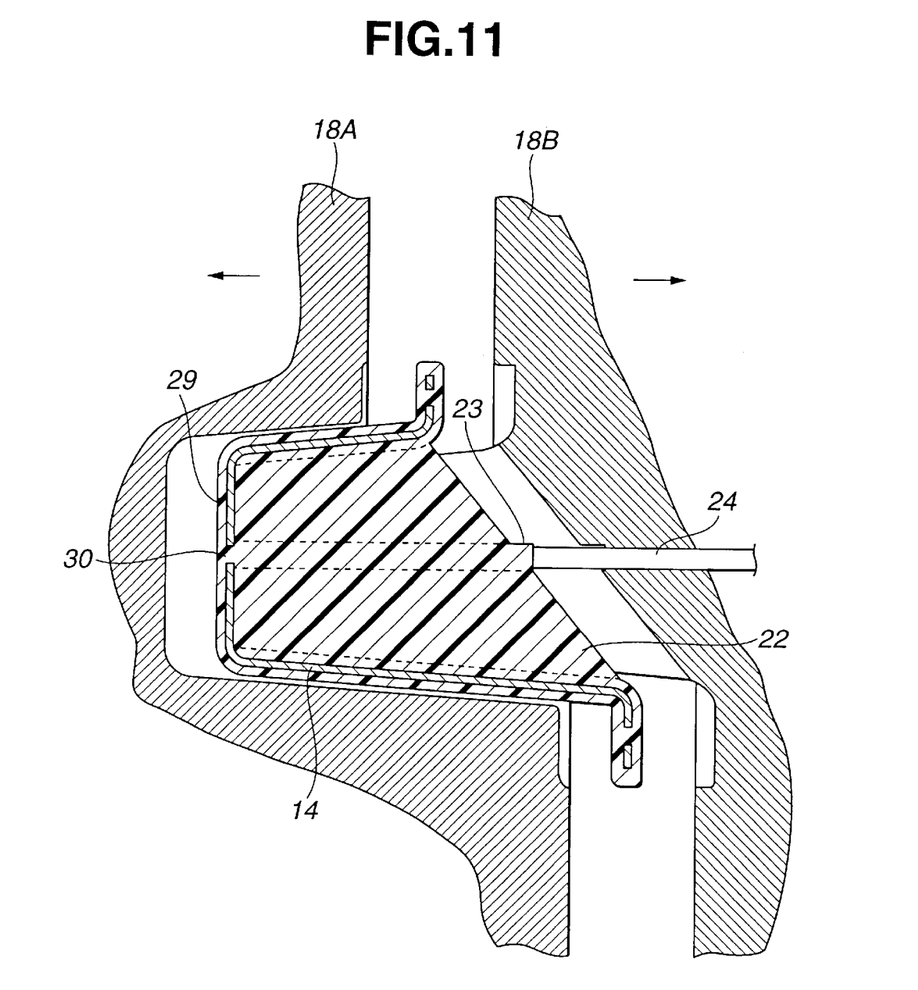
FIG. 11 is an sectional view of the lower elongate member in a condition wherein the radiator support lower member is being removed from a mold assembly with the aid of ejector pins.

That is, as is understood from FIG. 11, a mold assembly is prepared which generally comprises first and second molding dies 18A and 18B which are movable from and to each other to have an open position wherein as shown in the drawing the first and second molding dies 18A and 18B are separated and a closed position wherein the first and second molding dies 18A and 18B are tightly coupled in a manner to define therebetween a cavity having a given shape corresponding to the shape of the product, viz., the radiator core support structure 1. That is, at first, the mold assembly is forced to assume the open position, and the above-mentioned metal parts, namely, the upper elongate member 13 connected with the hood lock mounting member 16 and the lower elongate member 14 connected with the side members 17, are put in right positions of the cavity. For positioning the parts 13, 16, 14 and 17, a plurality of positioning pins are provided in the molding dies 18A and 18B. Then, the two molding dies 18A and 18B are tightly coupled permitting the mold assembly to assume the closed position. Then, a so-called injection molding is applied to the mold assembly, so that a molten plastic material (viz., glass fiber mixed plastic material) is injected to given positions of the cavity. After the plastic material in the cavity becomes to have a certain hardness, the two molding dies 18A and 18B are released as shown in FIG. 11, and the product, that is, the radiator core support structure 1 shown in FIG. 3, is removed from the released mold assembly.

As is seen from FIG. 3, by this injection molding, the hood lock stay portion 15, two pillar portions 19 and two lamp mounting portions 20 are produced. Each pillar portion 19 is integrated with the corresponding side member 17, and each lamp mounting portion 20 is integrated with both the corresponding side member 17 and upper elongate member 13. Each lamp mounting portion 20 has a complicated three-dimensional structure.

As shown in FIGS. 1, 2 and 3, the radiator core support structure 1 thus produced has two radiator openings 35, each being positioned between the hood lock stay portion 15 and the corresponding pillar portion 19.

Figure 5:
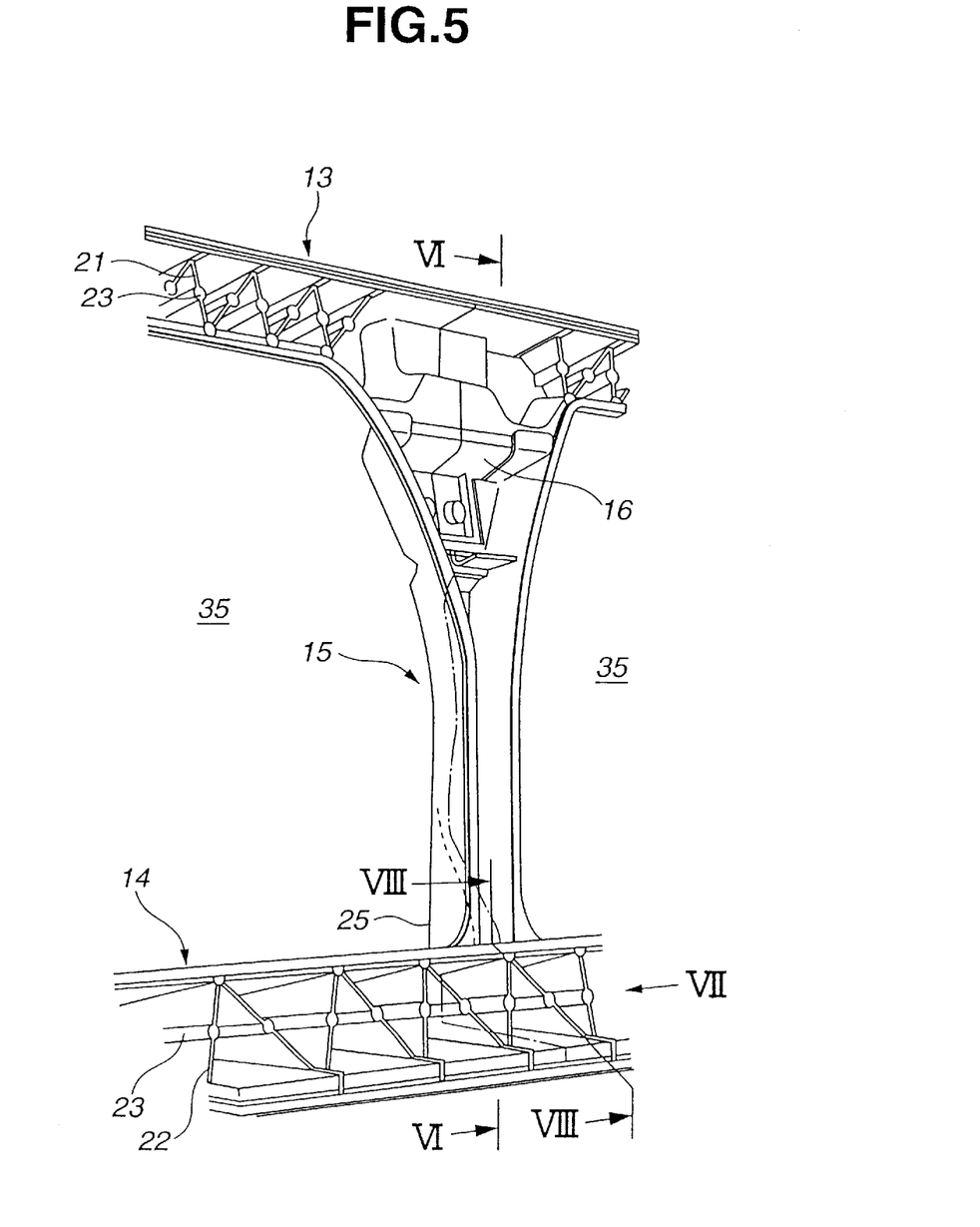
FIG. 5 is an enlarged back view of a portion of the radiator core support structure taken from the arrow "V" of FIG. 3, showing a rear view of a hood lock stay portion and its neighboring portions.

As is seen from FIG. 5, by the injection molding, a reinforcing structure of the plastic is formed in the channels defined by the upper and lower elongate members 13 and 14. That is, the reinforcing structure in the upper or lower elongate member 13 or 14 comprises a plurality of slanted ribs 21 or 22 which extend in a so-called zigzag manner in and along the channel of the upper or lower elongate member 13 or 14. As shown, the zigzag rib arrangement 21 or 22 extends from an upper or lower end portion of the hood lock stay portion 15 to a lateral end of the upper or lower elongate member 13 or 14.

It is to be noted that due to provision of such reinforcing structure of plastic integrally installed in the respective channels, the upper and lower elongate members 13 and 14 have an excellent mechanical strength.

Figure 7:
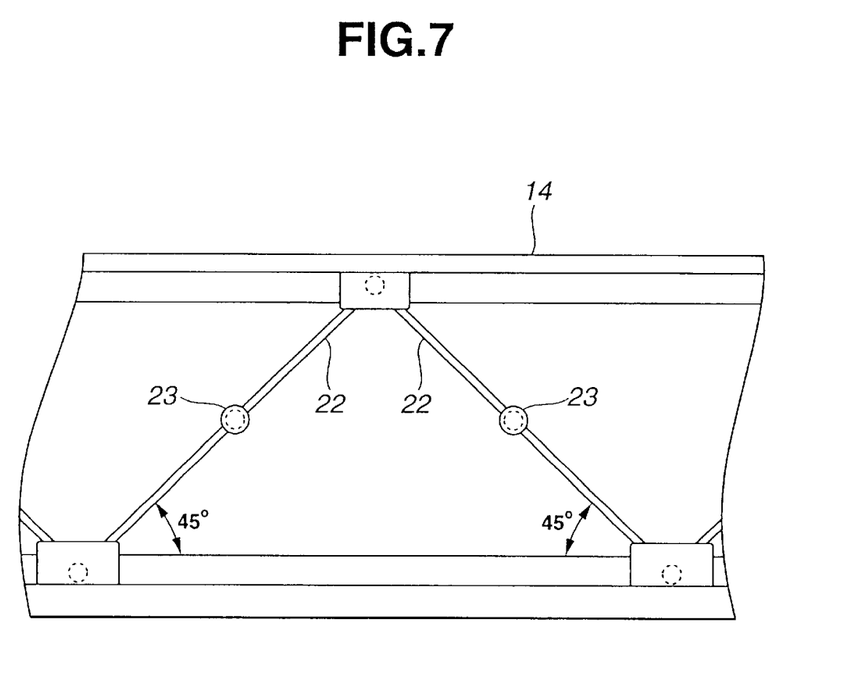
FIG. 7 is an enlarged view taken from the arrow "VII" of FIG. 5, showing zigzag arranged ribs of a lower elongate member.

As is seen from FIG. 7, preferably, each slanted rib 22 (or 21) is inclined about 450 relative to a longitudinal axis of the lower (or upper) elongate member 14 (or 13). In fact, the zigzag ribs 22 and 21 having such an inclined angle can exhibit an excellent performance in buckling strength and torsional rigidity.

Since the upper and lower elongate members 13 and 14 are connected through three portions, namely, the hood lock stay portion 15 and the two pillar portions 19, the rigidity of the radiator core support structure 1 against a vertical load is increased. Furthermore, since each pillar portion 19 is integrated with the side member 17 welded to the lower elongate member 14, lateral portions of the radiator core support structure 1 near the pillar portions 19 exhibit an excellent torsional rigidity. Furthermore, since the lateral ends of the upper elongate member 13 and the side members 17 are connected through the lamp mounting portions 20 having the complicated three-dimensional structure, the torsional rigidity of entire construction of the radiator core support structure 1 is much increased.

Referring back to FIG. 5, each slanted rib 21 or 22 has a cylindrical portion 23 at a middle portion thereof. The diameter of the cylindrical portion 23 is larger than the thickness of the rib 21 or 22. As is seen from FIG. 11, a rear end of each cylindrical portion 23 has a flat surface and is projected slightly. The projected rear end of each cylindrical portion 23 thus has a high rigidity.

Due to provision of the cylindrical portions 23 of high rigidity, the product 1 (viz., radiator core support structure) can be easily removed from the released mold assembly. That is, upon mold releasing, for facilitating removal of the product 1 from the mold assembly, ejector pins 24 are pushed against the rear ends of the cylindrical portions 23. If the ejector pins 24 are pushed against other portions having a poor rigidity, such as, upper and lower edges of the lower or upper elongate member 14 or 13, it may occur that the zigzag ribs 22 or 21 are broken due to undesired expanding movement of the edges caused by the pushing force of the ejector pins 24. Furthermore, if the ejector pins 24 are pushed directly against the bottom wall of the channel of the upper or lower elongate member 13 or 14, it may occur that the bottom portion, that is made of metal, is deformed. Thus, pushing the projected rear ends of the cylindrical portions 23 by the ejector pins 24 should be made with care.

Figure 6:
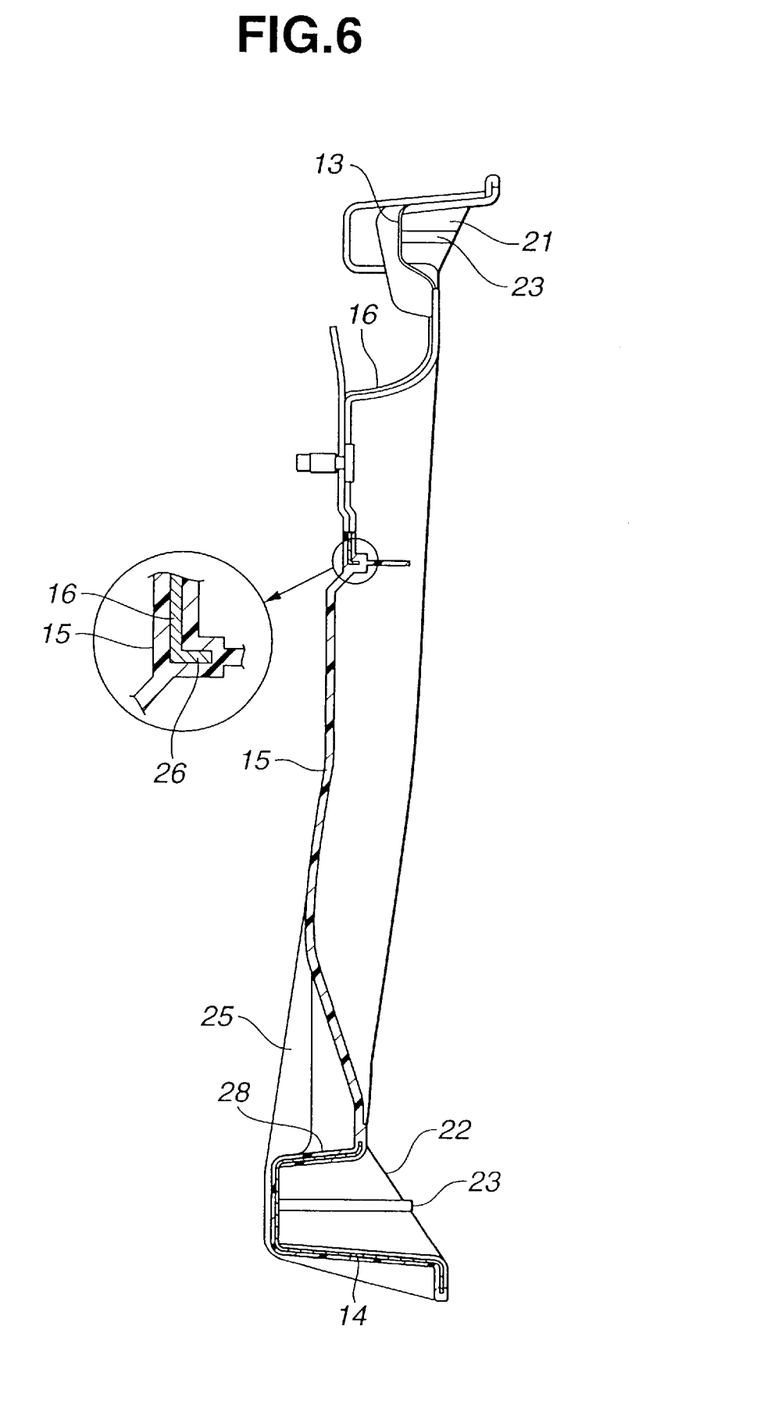
FIG. 6 is a sectional view take along the line "VI—VI" of FIG. 5.

As is seen from FIGS. 5 and 6, the hood lock stay portion 15 is constructed to have a generally C-shaped cross section and oriented that a channel thereof faces rearward, that is, toward the front structure 2 of the vehicle body. Due to this arrangement, each radiator opening 35 is allowed to smoothly receive cooling air for the condenser 7 and the radiator 8.

As is seen from FIGS. 3, 5 and 6, the hood lock stay portion 15 has a lower part 28 which grips the intermediate portion of the lower elongate member 14. More specifically, the lower part 28 is shaped to wholly surround the intermediate portion of the lower elongate member 14.

Near the lower part 28, the hood lock stay portion 15 has a depressed part whose bottom wall is bent rearward and connected with the upper edge of the lower elongate member 14. The depressed part is reinforced by two flanges 25, each extending vertically. For forming the depressed part of the hood lock stay portion 15, a cavity surface of the mold assembly has a projection of a shape matched with the depressed part. With this arrangement, the plastic-molded parts provided ahead of the flange portions (viz., flange portions of the hat-shape) of the lower elongate member 14 can have each a satisfied and uniform thickness.

As is seen from FIGS. 3, 5 and 6, the hood lock stay portion 15 has an upper part which is connected to the hood lock mounting member 16 welded to the upper elongate member 13. Due to this arrangement, the rigidity or mechanical strength of the hood lock mounting member 16 is increased. Although not shown in the drawings, a hood lock device is mounted on the hood lock mounting member 16 and a striker is mounted on a front end of an engine hood. When the hood is pivoted down to assume a closed position, the hood lock device catches the striker to latch or lock the hood at the closed position. Due to the robust arrangement of the hood lock mounting member 16, the hood catching is assuredly carried out. If the hood lock mounting member 16 fails to provide the hood lock device with a robust mounting base, undesired vibration of the hood tends to occur under running of the motor vehicle. In fact, robust construction of the hood lock mounting member 16 is needed particularly when an associated motor vehicle encounters a vehicle collision, particularly, head-on collision. If such robust construction is not provided to the hood lock mounting member 16, the vehicle collision would easily break a locked engagement between the hood lock device and the hood due to a great tensile load applied therebetween, which fails to induce a so-called two-fold bending of the hood, increasing the possibility of dangerous rush of the bent hood into the passenger cabin. As is known, upon a vehicle head-on collision, having the engine hood instantly bent (viz., two-fold bending) is very advantageous in not only absorbing the collision shock but also avoiding dangerous rush of the hood into the passenger cabin.

As is seen from FIG. 6, the hood lock mounting member 16 has a lower end 26 which is bent rearward and embedded in the hood lock stay portion 15. Due to this arrangement, a shock produced when the engine hood is bumped against the hood lock device is assuredly damped by the hood lock stay portion 15. Furthermore, due to such arrangement, the resistance of the hood lock mounting member 16 against the breakage of the locked engagement between the door lock device and the hood is increased.

As is seen from FIGS. 3, 8, 9 and 10, due to the injection molding, the radiator core support structure 1 has a plurality of portions 27, 28 and 29 which are covered or wrapped with the molded plastic. It is to be noted that the molded plastic covering the portions 27, 28 and 29 are integral with the zigzag ribs 21 or 22 installed in the channel of the upper or lower elongate member 13 or 14. Due to provision of these plastic covering portions 27, 28 and 29, integrated connection between the metal made parts (viz., 13, 14, 16 and 17) and the plastic made portions (viz., 27, 28, 29, 15, 19, 20) is improved, which increases the mechanical strength of the entire construction of the radiator core support structure 1 of the invention.

Figure 8:
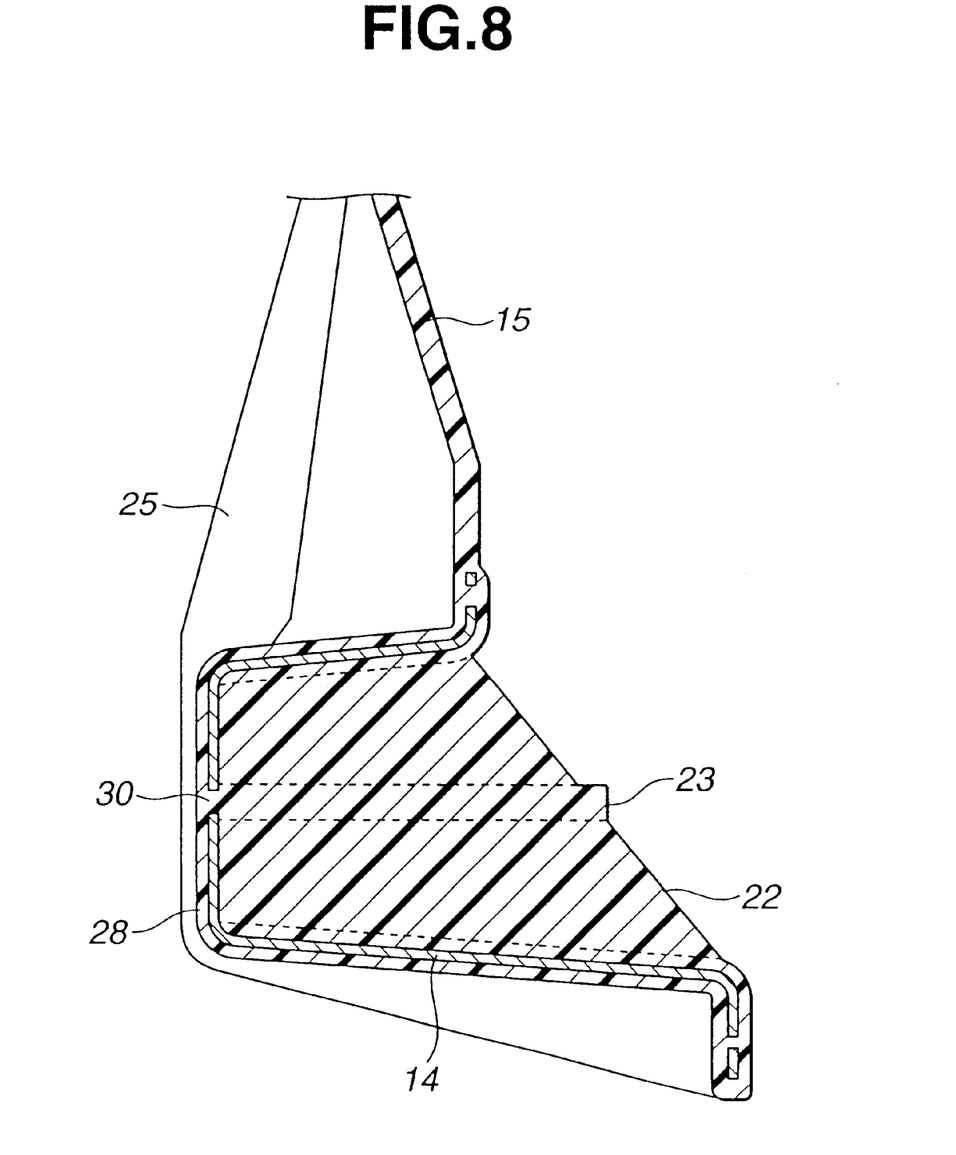
FIG. 8 is an enlarged sectional view taken along the line "VIII—VIII" of FIG. 5, showing the lower elongate member and its neighboring parts.

As is seen from FIG. 8, the lower elongate member 14 is formed at the front and bottom walls of the hat-shaped channel thereof with a plurality of through holes 30 through which the plastic lying on the front surface of the lower elongate member 14 is integrally connected with the zigzag ribs 22 installed in the channel. Like this, the plastic lying on the front surface of the upper elongate member 13 is integrally connected with the zigzag ribs 21 in the channel of the upper elongate member 13. Due to this integral connection, the plastic parts that cover the portions 27, 28 and 29 are tightly secured or bonded to the upper or lower elongate member 13 or 14. In the illustrated embodiment, the through holes 30 are aligned with the cylindrical portions 23 of the zigzag ribs 22. This arrangement promotes the resistance of the hood lock stay portion 15 against the tensile load which would be applied thereto upon the vehicle collision.

As is seen from FIG. 3, the plastic portions 27 lying on the upper elongate member 13 are formed with respective brackets 31 to which a front grill (not shown) of the vehicle is connected. One of the plastic portions 29 lying on the lower elongate member 14 is formed with a bracket 32 which holds the power-steering oil cooler tube 6 (see FIG. 2). One of the pillar portions 19 is formed with a bracket 34.

As is described hereinabove, before the radiator core support structure 1 is mounted to the front structure 2 of the vehicle body, the various parts 3, 4, 5, 6, 7, 8 and 9 (see FIG. 2) are mounted to the structure 1 to constitute a part carrier module. Then, as will be seen from FIG. 1, the module (1) is brought to the front structure 2 of the vehicle body. Then, the side members 17 of the radiator core support structure 1 are tightly connected to the front ends of the front side members 10 of the front structure 2 of the vehicle body and then opposed ends of the upper elongate member 13 are tightly connected to front ends of the hood ridge panels 11.

As has been described hereinabove, the radiator core support structure 1 of the present invention has the metal made parts and plastic made portions which are integrally connected to one another upon injection molding to constitute a robust construction of the structure 1. Thus, the torsional distortion and dimensional error of the radiator core support structure 1 of the invention are suppressed or at least minimized, which facilitates the mounting of the radiator core support structure 1 to the front structure 2 of the vehicle body.

Since the hood lock stay portion 15 is tightly connected to the upper and lower elongate members 13 and 14 in the above-mentioned manner, the stay portion 15 can satisfactorily bear the shock which would be applied thereto when the engine hood is bumped against the hood lock mechanism on the hood lock mounting member 16. This robust construction of the hood lock stay portion 15 minimizes the possibility of undesired breakage of the locked engagement between the hood lock device and the hood upon a vehicle collision.

The entire contents of Japanese Patent Application 2000-363344 filed Nov. 29, 2000 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A radiator core support structure comprising:

an upper elongate member made of metal;

a lower elongate member made of metal; and mutually spaced pillar portions of molded plastic, each pillar portion having an upper end integrally connected to said upper elongate member and a lower end integrally connected to said lower elongate member, wherein said upper and lower elongate members each comprises a channel member, and a reinforcing structure of molded plastic is installed in the channel member to reinforce the respective upper and lower elongate members.

2. A radiator core support structure as claimed in claim 1, wherein the reinforcing structure of the molded plastic installed in the channel of the upper elongate member extends between the upper ends of adjacent two of the pillar portions, and wherein the reinforcing structure of the plastic installed in the channel of the lower elongate member extends between the lower ends of adjacent two of the pillar portions.

3. A radiator core support structure as claimed in claim 2, wherein the reinforcing structure of the plastic comprises a plurality of alternately slanted ribs which are arranged to run in a zigzag line.

4. A radiator core support structure comprising:

an upper elongate member made of metal;

a lower elongate member made of metal; and mutually spaced pillar portions of molded plastic, each pillar portion having an upper end integrally connected to said upper elongate member and a lower end integrally connected to said lower elongate member, wherein said pillar portions comprise:

a hood lock stay portion having an upper end connected to an intermediate portion of said upper elongate member and a lower end connected to an intermediate portion of said lower elongate member; and two pillar portions, each having an upper end connected to a laterally extending outside end portion of said upper elongate member and a lower end connected to a laterally extending outside end portion of said lower elongate member.

5. A radiator core support structure as claimed in claim 4, further comprising a hood lock mounting member made of metal, said hood lock mounting member being welded to the intermediate portion of said upper elongate member and connected to the upper end of said hood lock stay portion.

6. A radiator core support structure as claimed in claim 4, further comprising two side members made of metal, each side member being welded to the laterally extending outside end portion of said lower elongate member and connected to one of said two pillar portions.

7. A radiator core support structure as claimed in claim 5, wherein said hood lock mounting member has a bent lower end which is embedded in said hood lock stay portion.

8. A radiator core support structure as claimed in claim 6, further comprising two lamp mounting portions made of the integrally molded plastic, each lamp mounting portion being interposed between the laterally extending outside end portion of said upper elongate member and one of the side members.

9. A radiator core support structure comprising:

an upper elongate member made of metal;

a hood lock mounting member made of metal, said hood lock mounting member being welded to an intermediate portion of said upper elongate member;

a lower elongate member made of metal;

two side members made of metal, said side members being welded to laterally opposed ends of said lower elongate member;

a hood lock stay portion made of an integrally molded plastic, said hood lock stay portion having an upper end connected to said hood lock mounting member and a lower end connected to an intermediate portion of said lower elongate member;

two pillar portions made of the integrally molded plastic, each pillar portion extending between laterally outside portions of said upper and lower elongate members;

an upper reinforcing structure made of the integrally molded plastic, said upper reinforcing structure extending in a channel defined in said upper elongate member and integrally connected with the upper end of said hood lock stay portion as well as the upper ends of said two pillar portions; and a lower reinforcing structure made of the integrally molded plastic, said lower reinforcing structure extending in a channel defined in said lower elongate member and integrally connected with the lower end of said hood lock stay portion as well as the lower ends of said two pillar portions.

* * * * *